(12) United States Patent
Okabe et al.

(10) Patent No.: US 8,582,072 B2
(45) Date of Patent: Nov. 12, 2013

(54) METHOD FOR MANUFACTURING DISPLAY DEVICE AND DISPLAY DEVICE

(75) Inventors: Tohru Okabe, Osaka (JP); Takeshi Hara, Osaka (JP); Tetsuya Aita, Osaka (JP); Tsuyoshi Inoue, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 216 days.

(21) Appl. No.: 12/933,763

(22) PCT Filed: Mar. 3, 2009

(86) PCT No.: PCT/JP2009/000960
§ 371 (c)(1),
(2), (4) Date: Sep. 21, 2010

(87) PCT Pub. No.: WO2009/147769
PCT Pub. Date: Dec. 10, 2009

(65) Prior Publication Data
US 2011/0007259 A1    Jan. 13, 2011

(30) Foreign Application Priority Data
Jun. 6, 2008 (JP) .................. 2008-149596

(51) Int. Cl.
*G02F 1/1333* (2006.01)
(52) U.S. Cl.
USPC .......................... 349/158; 349/187

(58) Field of Classification Search
USPC .................................. 349/158, 187
See application file for complete search history.

(56) References Cited

U.S. PATENT DOCUMENTS

| 5,273,475 A * | 12/1993 | Oshikawa ................ 445/24 |
| 5,869,150 A | 2/1999 | Iwamoto |
| 6,037,026 A | 3/2000 | Iwamoto |
| 2005/0117197 A1* | 6/2005 | Ide ................... 359/291 |
| 2009/0290113 A1* | 11/2009 | Nakahata et al. ........... 349/138 |
| 2010/0231840 A1* | 9/2010 | Saida et al. ................ 349/153 |

FOREIGN PATENT DOCUMENTS

| JP | 7-64067 A | 3/1995 |
| JP | 8-86993 A | 4/1996 |
| JP | 2002-14310 A | 1/2002 |
| JP | 2003-29657 A | 1/2003 |
| JP | 2003-258078 A | 9/2003 |

* cited by examiner

*Primary Examiner* — Phu Vu
(74) *Attorney, Agent, or Firm* — Birch, Stewart, Kolasch & Birch, LLP

(57) ABSTRACT

A method for manufacturing a display device 10 includes a substrate supporting step for supporting a plastic substrate 19 on a support substrate 50, with the plastic substrate 19 curved, and a thin film lamination step for laminating a plurality of thin films on the plastic substrate 19 supported on the support substrate 50.

5 Claims, 3 Drawing Sheets

METHOD FOR MANUFACTURING DISPLAY DEVICE AND DISPLAY DEVICE

TECHNICAL FIELD

The present invention relates to a method for manufacturing a display device and a display device.

BACKGROUND ART

Efforts are being made to research and develop, as a next generation device technique, flexible devices in which a thin film device, such as a TFT (thin film transistor) and an electroluminescence device, is formed on a flexible substrate, such as a plastic substrate, instead of on a glass substrate or the like. One of significant features of the plastic substrate is that it is thin and flexible, compared to the glass substrate. Thus, the transportation of the substrate is a significant technical challenge in the device fabrication. Among various techniques developed as solutions to this challenge, a technique in which a plastic substrate is transported with the plastic substrate attached to a support substrate, such as a glass substrate which is thick and not easily bent, is expected to be the most promising technique, since having a significant advantage that the same existing device as used for the support substrate can be used.

For example, Patent Document 1 discloses as one of the techniques for manufacturing a display device made of a flexible substrate such as a plastic substrate, a jig for substrate transportation which is for transporting a substrate of a liquid crystal display element to a next process, with the substrate supported on a surface of the jig, and which is provided with an adhesive material layer on the support body whose adhesive power for holding the substrate attached to the surface of the jig is maintained almost constant despite repeated use. Patent Document 1 further discloses a technique for manufacturing a liquid crystal display element in which processes for forming a liquid crystal display element are sequentially performed with respect to the substrate adhering to the jig for substrate transportation, and after a predetermined process, the substrate is removed from the jig for substrate transportation, and the jig for substrate transportation is reused thereafter for adhesion of another substrate. Patent Document 1 mentions that according to the above technique, a thin plate-like glass substrate, a plastic substrate or the like is attached to the jig for substrate transportation, and is transported to a next fabrication process of the liquid crystal display element, and therefore that it is possible to fabricate a liquid crystal display element whose substrate is made of a material that does not have strength or rigidity when used alone, by utilizing the same manufacturing line designed for a conventional liquid crystal display element whose substrate is made of glass. Further, Patent Document 1 mentions that the above jig can be repeatedly used, and therefore that it is possible to significantly reduce the fabrication cost of the liquid crystal display element, compared to a disposal jig.

CITATION LIST

Patent Document

PATENT DOCUMENT 1: Japanese Patent Publication No. H8-86993

SUMMARY OF THE INVENTION

Technical Problem

In the case where a plastic substrate is transported after being attached, for example, to a non-alkali glass substrate, the degree of thermal expansion significantly differs between the two substrates because a thermal expansion coefficient of the non-alkali glass substrate is about 4 ppm/° C., and a thermal expansion coefficient of a general plastic substrate is 20-200 ppm/° C. Thus, because of the difference in thermal expansion between the two substrates, significant warping may occur in the fabrication of a thin film lamination device, in which the highest temperature of the fabrication process is as high as about 300° C. This makes the transportation of the substrate difficult. Moreover, the difference in the thermal expansion creates significant stress between the two substrates. As a result, the plastic substrate may be separated from the support substrate. To avoid this, a thermosetting adhesive material which is said to have strong adhesive power in general is used to attach the two substrates to each other, and the substrates need to be attached at a high temperature in order that the adhesive material is cured. Thus, no warping occurs shortly after the attachment at the high temperature, but after the substrate is placed on a flat stage 100 or the like to cool it to a room temperature, concave warping occurs due to the difference in thermal expansion between the plastic substrate 101 and the support substrate 102, as shown in FIG. 6. Here, in the case of the convex warping as shown in FIG. 7, the substrate's own weight is applied to the entire substrate, and therefore, the substrate becomes flat depending on the amount of warping. On the other hand, in the case of concave warping, the center of the substrate is in contact with the flat stage 100, and thus, most of the substrate's own weight is not applied to the substrate, and warping remains. In the device fabrication process, transportation occurs mostly at a room temperature. Therefore, the concave warping of the substrate at the time of transportation at a room temperature results in causing significant problems, such as variations in temperature distribution, uneven film formation, and the support substrate coming in contact with the device.

The present invention was made in view of the above problems, and it is an objective of the invention to provide a method for manufacturing a display device by which a highly reliable device can be easily formed on a flexible substrate, and to provide a display device.

Solution to the Problem

A method for manufacturing a display device according to the present invention includes a substrate supporting step for supporting a flexible substrate on a support substrate, with the flexible substrate curved, and a thin film lamination step for laminating a plurality of thin films on the flexible substrate supported on the support substrate.

According to this structure, it is possible to control the amount of warping of the substrate to an appropriate amount before fabrication of a thin film lamination device in which a plurality of thin films are laminated, in the case where the flexible substrate is transported, with the flexible substrate supported on the support substrate whose linear expansion coefficient and water absorption properties are different from those of the flexible substrate. Consequently, the flexible substrate and the support substrate can be transported with ease, and it is possible to form highly reliable devices.

Further, in the method for manufacturing a display device according to the present invention, in the substrate supporting step, the flexible substrate may be formed directly on the support substrate.

According to this structure, no adhesive is necessary to support the flexible substrate. Thus, fabrication costs can be reduced.

Further, in the method for manufacturing a display device according to the present invention, the flexible substrate has a rectangular shape, and in the substrate supporting step, the flexible substrate is curved along a direction of a longitudinal axis of the flexible substrate.

According to this structure, the flexible substrate is curved along a direction of a longitudinal axis of the flexible substrate, along which direction the flexible substrate can be curved more easily than it is curved along other directions. Thus, the amount of warping of the substrate can be controlled more easily.

Further, in the method for manufacturing a display device according to the present invention, the flexible substrate may be a plastic substrate.

According to this structure, the amount of warping of the support substrate which supports the flexible substrate can be more successfully controlled by using a plastic substrate as the flexible substrate. Thus, the thin film lamination device can be formed on the flexible substrate more easily.

Further, in the method for manufacturing a display device according to the present invention, the flexible substrate may be a plastic substrate which contains a glass cloth.

According to this structure, the use of a plastic substrate which contains a glass cloth decreases a linear expansion coefficient of the flexible substrate. Thus, the amount of warping of the flexible substrate decreases, and it is possible to form highly reliable devices.

Further, in the method for manufacturing a display device according to the present invention, the flexible substrate has a thickness of 20-200µm.

According to this structure, the thickness of the flexible substrate is 20-200µm. Thus, the flexible substrate can be treated more easily when flexible substrate is detached from the support substrate.

Further, in the method for manufacturing a display device according to the present invention, the flexible substrate has a rectangular shape, and a length of the flexible substrate along a direction of a longitudinal axis of the flexible substrate may be 300 mm or more.

According to this structure, the thin film lamination device can be formed on a large flexible substrate whose length along the direction of the longitudinal axis is 300 mm or more.

Further, in the method for manufacturing a display device according to the present invention, the support substrate may be an alkali glass substrate.

According to this structure, the amount of warping can be successfully controlled since the thermal expansion coefficient of the support substrate is greater than the thermal expansion coefficient of a non-alkali glass.

Further, in the method for manufacturing a display device according to the present invention, an alkali metal elusion barrier layer may be provided on a rear surface of the alkali glass substrate.

According to this structure, the alkali metal elusion barrier layer can prevent elusion of an alkali metal from the rear surface of the alkali glass substrate. Thus, it is possible to form highly reliable devices.

Further, in the method for manufacturing a display device according to the present invention, the alkali metal elusion barrier layer may be provided on the rear surface of the alkali glass substrate, and in this state, hold the alkali glass substrate in a convex shape.

According to this structure, warping of the support substrate and the flexible substrate can be successfully prevented.

Further, in the method for manufacturing a display device according to the present invention, in the substrate supporting step, the flexible substrate may be attached to the support substrate to be supported by the support substrate.

According to this structure, the flexible substrate can be supported by the support substrate with ease.

Further, in the method for manufacturing a display device according to the present invention, in the substrate supporting step, the flexible substrate is attached to the flexible substrate by heating.

According to this structure, the flexible substrate and the support substrate are successfully attached to each other by heating. Further, it becomes easy to control the amount of warping in a process for manufacturing a thin film lamination device, which process in general includes a heating process.

Further, in the method for manufacturing a display device according to the present invention, in the substrate supporting step, the flexible substrate may be attached to the flexible substrate such that each of the flexible substrate and the support substrate becomes flat in a room temperature after the flexible substrate and the support substrate attached to each other are placed on a flat portion.

According to this structure, the amount of warping of the flexible substrate and the support substrate which supports the flexible substrate can be zero before the flexible substrate and the support substrate are transported to the next step. Thus, the flexible substrate and the support substrate can be transported more easily.

Further, in the method for manufacturing a display device according to the present invention, in the substrate supporting step, the flexible substrate may be attached to the flexible substrate by pressing the flexible substrate against the support substrate.

According to this structure, the flexible substrate and the support substrate are firmly attached to each other, thereby making it possible to successfully support the flexible substrate on the support substrate. Further, smoothness of the substrate surface can be improved in a process for manufacturing a thin film lamination device, in which process a high degree of surface smoothness of the substrate (in general, a difference between surface irregularities is about several tens of gm or less) is required. Thus, it is possible to form highly reliable devices.

Further, in the method for manufacturing a display device according to the present invention, in the substrate supporting step, the flexible substrate and the support substrate may be attached to each other with a thermosetting adhesive.

According to this structure, the flexible substrate and the support substrate are firmly attached to each other, thereby making it possible to successfully support the flexible substrate on the support substrate.

Further, in the method for manufacturing a display device according to the present invention, a film thickness of the thermosetting adhesive with which the flexible substrate and the support substrate are attached to each other may be 10-100 µm.

According to this structure, it is possible to achieve surface smoothness of the flexible substrate, and at the same time, possible to reduce warping of the flexible substrate and the support substrate more successfully.

Further, in the method for manufacturing a display device according to the present invention, the thermosetting adhesive may be made of a silicone-based resin material.

According to this structure, the thermosetting adhesive is a silicone-based resin material. Thus, the adhesive is a low elastic material that is not warped by the adhesive itself. For this reason, it is possible to form devices on the flexible substrate more easily. Further, the silicone-based resin material is less likely to provide contamination in the process for manufacturing a thin film device. Thus, more reliable devices can be obtained.

Further, in the method for manufacturing a display device according to the present invention, in the substrate supporting step, the thermosetting adhesive may be cured at a temperature obtained by dividing by 2 a result of subtracting a lowest process temperature from a highest process temperature of process temperatures for laminating the plurality of thin films on the flexible substrate in the thin film lamination step.

According to this structure, it is possible to reduce the stress generated between the flexible substrate and the support substrate as much as possible, in the process for manufacturing a thin film device. Thus, warping of the flexible substrate and the support substrate can be successfully prevented.

A display device according to the present invention is manufactured by the above-described method for manufacturing a display device.

According to this structure, it is possible to control the amount of warping of the substrate to an appropriate amount before fabrication of a thin film lamination device in which a plurality of thin films are laminated, in the case where the flexible substrate is transported, with the flexible substrate supported on the support substrate whose linear expansion coefficient and water absorption properties are different from those of the flexible substrate. Consequently, the flexible substrate and the support substrate can be transported with ease, and it is possible to form highly reliable devices.

Advantages of the Invention

According to the present invention, it is possible to provide a method for manufacturing a display device by which a highly reliable device can be easily formed on a flexible substrate, and to provide a display device.

Figure 1:
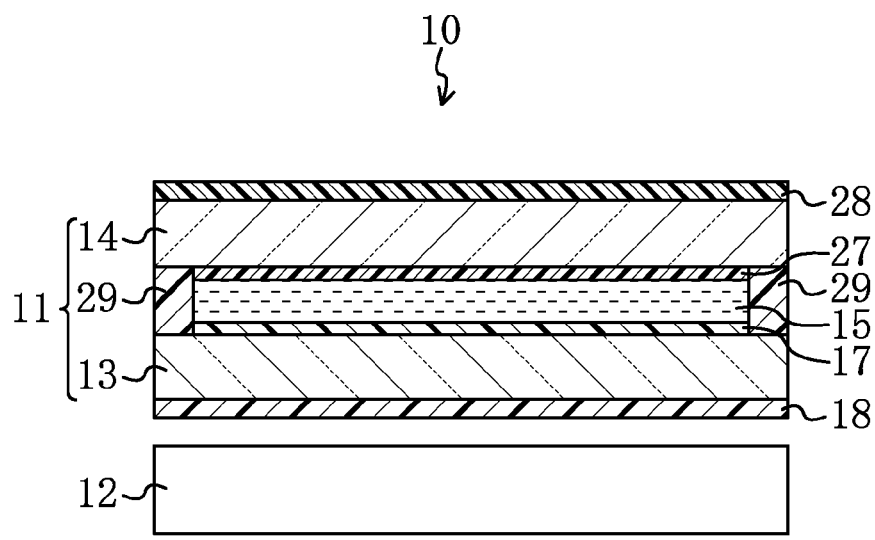
FIG. 1 shows a cross-sectional view of a liquid crystal display device according to an embodiment of the present invention.

DESCRIPTION OF REFERENCE CHARACTERS 10 liquid crystal display device
13 thin film transistor substrate
14 counter substrate
19, 32 plastic substrate
50 support substrate
51 thermosetting adhesive
52 alkali metal elusion barrier layer
53 convexly-curved attachment table
54 concavely-curved attachment upper plate

DESCRIPTION OF EMBODIMENTS

Structures of a display device according to an embodiment of the present invention, and a method for manufacturing the display device will be described in detail hereinafter with reference to the drawings. It should be noted that the present invention is not limited to the following embodiment. Further, in the present embodiment, a liquid crystal display device is used as an example of a display device for describing the invention.

(Structure of Liquid Crystal Display Device 10)

FIG. 1 shows a cross-sectional view of a liquid crystal display device 10 according to an embodiment of the present invention. The liquid crystal display device 10 includes a liquid crystal display panel 11 and a back light 12.

The liquid crystal display device 10 includes a thin film transistor substrate 13 and a counter substrate 14, each of which is a thin film lamination device formed by laminating a plurality of thin films on a plastic substrate (a flexible substrate). The liquid crystal display device 10 has a liquid crystal layer 15 formed between the thin film transistor substrate 13 and the counter substrate 14.

Figure 2:
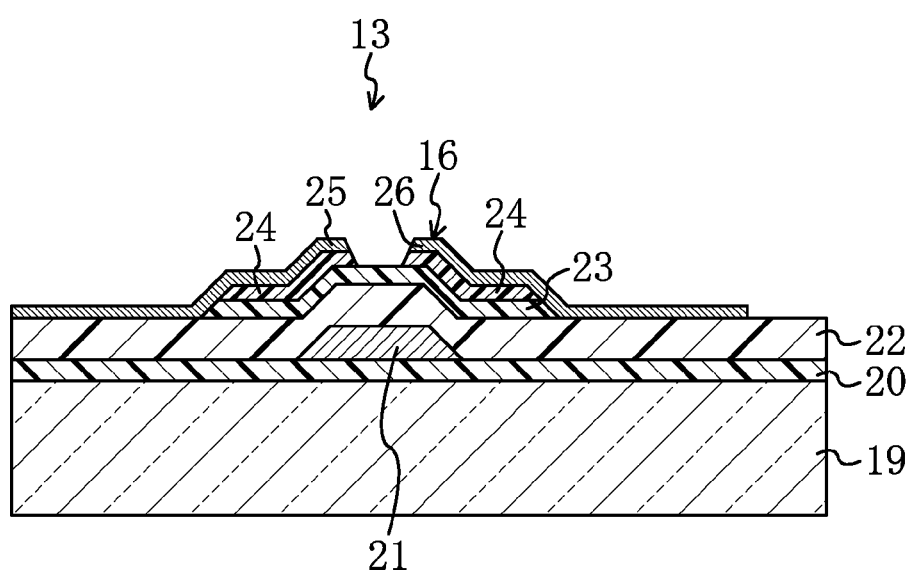
FIG. 2 shows a cross-sectional view of a thin film transistor substrate according to an embodiment of the present invention.

FIG. 2 shows a cross-sectional view of the thin film transistor substrate 13. A plurality of pixels (not shown) are provided on the thin film transistor substrate 13, and a thin film transistor 16 is formed for each pixel. Further, a surface of the thin film transistor substrate 13 that is the liquid crystal layer 15 side is provided with an oriented film 17, and a surface of the thin film transistor substrate 13 that is opposite to the liquid crystal layer 15 side is provided with a polarizing plate 18.

The thin film transistor substrate 13 is made of a plastic substrate 19 whose length and width are 360 mm and 465 mm, respectively, and whose thickness is 20 μm. The plastic substrate 19 is made, for example, of at least one of epoxy resin, PET resin, PES resin, polyimide resin, polyester, polycarbonate, acrylate resin, and others. Further, the plastic substrate 19 may be anything as long as it is a substrate exhibiting flexibility, and may be a compound type plastic substrate which includes such as a glass component. The flexible substrate is not limited to a plastic substrate, but may be a substrate made of such as stainless foil.

A SiNx film 20, for example as a base coat, is provided on one surface of the plastic substrate 19. A gate electrode 21 made, for example, of Ti is provided on part of the SiNx film 20 so as to correspond to each pixel (not shown). A gate insulating film 22 made of such as a SiNx layer is provided to cover the SiNx film 20 and the gate electrode 21.

A semiconductor layer 23 is provided on the gate insulating film 22, and covers the entire gate electrode 21 via the gate insulating film 22. The semiconductor layer 23 is made, for example, of at least one of amorphous Si (a-Si), polycrystal Si, microcrystal Si, oxide semiconductor, and others.

An n+semiconductor layer 24 doped with an n-type impurity at a high concentration is provided on the semiconductor layer 23. A source electrode 25 and a drain electrode 26 made of such as Ti are provided on the n+semiconductor layer 24 and the gate insulating film 22. As described, the thin film transistor 16 having the gate electrode 21, the source electrode 25 and the drain electrode 26, is provided on the thin film transistor substrate 13.

The thin film transistor 16 is covered with a protective layer (not shown) made of such as a SiNx layer. Further, a pixel electrode (not shown) which forms a pixel is provided on the drain electrode 26. The drain electrode 26 and the pixel electrode are electrically connected to each other.

Figure 3:
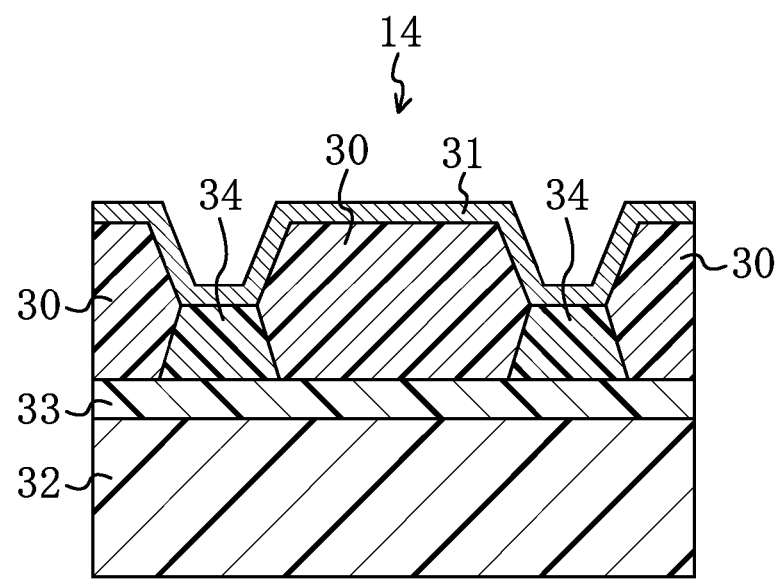
FIG. 3 shows a cross-sectional view of a counter substrate according to an embodiment of the present invention.

As shown in FIG. 3, the counter substrate 14 includes a plastic substrate 32. A SiNx film 33, for example as a base coat, is provided on the plastic substrate 32. A plurality of color filter layers 30, each forming a pixel, is provided on the SiNx film 33 at predetermined intervals. A black matrix layer 34 which partitions the plurality of color filter layers 30 is provided between adjacent color filter layers 30. A counter electrode 31 is provided so as to cover the color filter layers 30 and the black matrix layer 34. A surface of the counter substrate 14 that is on the liquid crystal layer 15 side is provided with an oriented film 27, and a surface of the counter substrate 14 that is opposite to the liquid crystal layer 15 side is provided with a polarizing plate 28.

The liquid crystal layer 15 is sealed by a sealing member 29 provided between the thin film transistor substrate 13 and the counter substrate 14. Further, a columnar spacer (not shown) made of such as plastic and glass is provided between the thin film transistor substrate 13 and the counter substrate 14 to make uniform space between the substrates 13 and 14.

(Method for Manufacturing Liquid Crystal Display Device 10)

Next, a method for manufacturing a liquid crystal display device 10 according to an embodiment of the present invention will be described. First, a silicone-based thermosetting adhesive 51 having a thickness of 10 μm is accurately and uniformly applied by a slit coater to a support substrate 50 made of a glass substrate, whose length and width are 360 mm and 465 mm, respectively, and whose thickness is 0.7 mm. Here, alkali glass is used to form the support substrate 50 because the greater the thermal expansion coefficient of the material of the support substrate 50, the better. The expansion coefficient of the alkali glass which forms the support substrate is 8-15 ppm/° C. that is greater than the expansion coefficient of non-alkali glass, i.e., 4 ppm/° C. An alkali metal elusion barrier layer 52 is provided on a rear surface of the support substrate 50 made of an alkali glass substrate, for preventing elusion of alkali metal in the process for manufacturing a thin film device. Preferably, the alkali metal elusion barrier layer 52 is provided to the rear surface of the support substrate 50, and in this state, holds the support substrate 50 in a convex shape. Here, a SiNx film whose film thickness is 3000 Å is formed on the rear surface of the alkali glass, by sputtering, under conditions which make the SiNx film have a tensile stress. Further, a silicone-based adhesive is used as a material for the thermosetting adhesive 51, because a silicone-based adhesive is a low elastic material that is not warped by the adhesive itself and because a silicone-based adhesive provides less contamination in the process for manufacturing a thin film device. It is preferable that the thickness of the thermosetting adhesive 51 is 10-100 μm.

Figure 4:
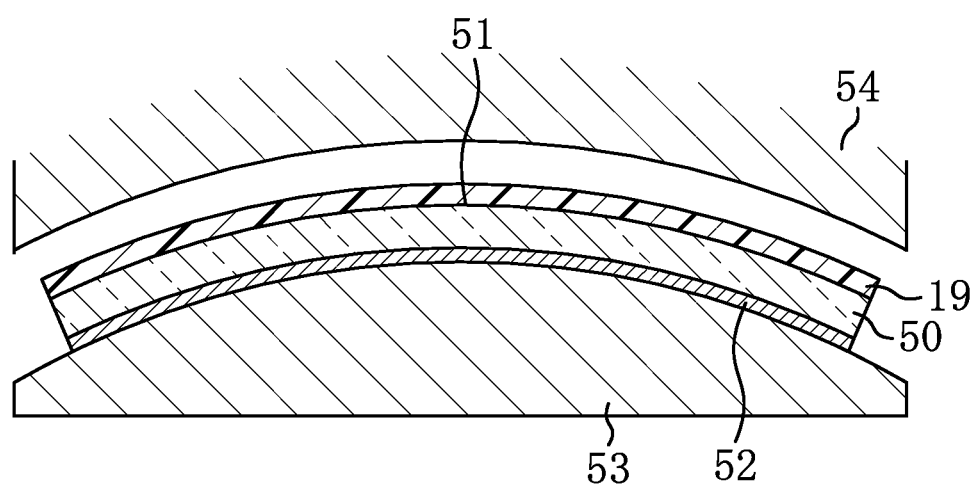
FIG. 4 shows a cross-sectional view of a plastic substrate that is curved and supported on a support substrate according to an embodiment of the present invention.

Next, as shown in FIG. 4, the plastic substrate 19 whose length and width are 360 mm and 465 mm, respectively, and whose thickness is 20 μm is placed with accuracy on the thermosetting adhesive 51. The plastic substrate 19 and the support substrate 50 are brought into vacuum contact with a convexly-curved attachment table 53 made of a convexly-curved stainless steel, thereby fixing the plastic substrate 19 onto the support substrate 50. Here, the plastic substrate 19 and the support substrate 50 are convexly curved along the direction of their longitudinal axis. Further, an amorphous silicon film (not shown) is formed on the rear surface of the plastic substrate 19 by sputtering so that the plastic substrate 19 can be separated from the support substrate 50 by laser after the fabrication of the thin film device.

The plastic substrate 19 may be made of any kind of materials, but preferably of a material whose thermal expansion coefficient is low, and can be made of a compound type plastic substrate 19 which contains a glass cloth (a fabric made of glass fibers). Further, the thinner the thickness of the plastic substrate 19, the better, because it can reduce warping. However, an excessively thin plastic substrate 19 cannot be transported after separation from the support substrate 50. In view of this, the inventors of the present invention have studied and found that the thickness of the plastic substrate 19 is preferably 20-200 μm. Moreover, instead of using the thermosetting adhesive 51, the plastic substrate may be directly formed on the support substrate 50 by a slit coater or the like, using a material such as PES (polyether sulphone) and polyimide. Further, instead of using an adhesive, a method may be used in which the plastic substrate 19 and the support substrate 50 are attached to each other in a room temperature by making the surfaces of the plastic substrate 19 and the support substrate 50 rough by a plasma treatment.

Next, the adhesive is cured at 150° C. for two hours, during which a stainless-steel convexly-curved attachment upper plate 54 that is made convex to have the same curvature as that of the convexly-curved attachment table 53 is brought down to be parallel to, and to be pressed against, the convexly-curved attachment table 53. The pressing not only increases the adhesiveness between the plastic substrate 19 and the support substrate 50, but also increases the smoothness of the substrate surface. Further, the temperature 150° C. at which the adhesive is cured is close to a temperature obtained by {a highest temperature (e.g., 320° C.)–a lowest temperature (e.g., 20° C.) of the temperatures of the processes in a process for manufacturing a thin film device}/2. This is for reducing the stress generated between the plastic substrate 19 and the support substrate 50 in the process for manufacturing a thin film device as much as possible. Like heating, UV irradiation is another method for curing an adhesive. However, an advantage is that the adhesive will have stronger adhesive power when cured by heating.

Figure 5:
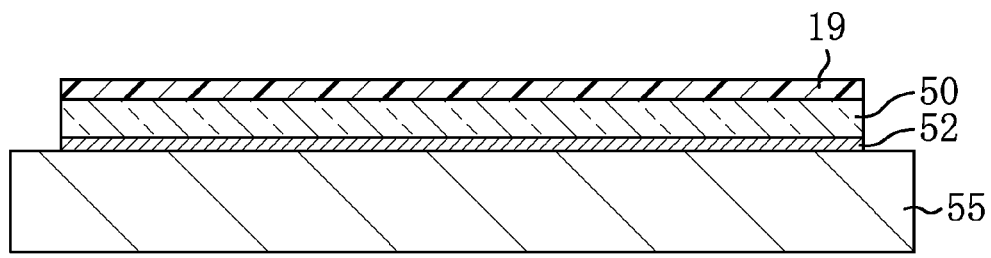
FIG. 5 shows a cross-sectional view of the plastic substrate and the support substrate which are placed on a stage according to an embodiment of the present invention.
Figure 6:
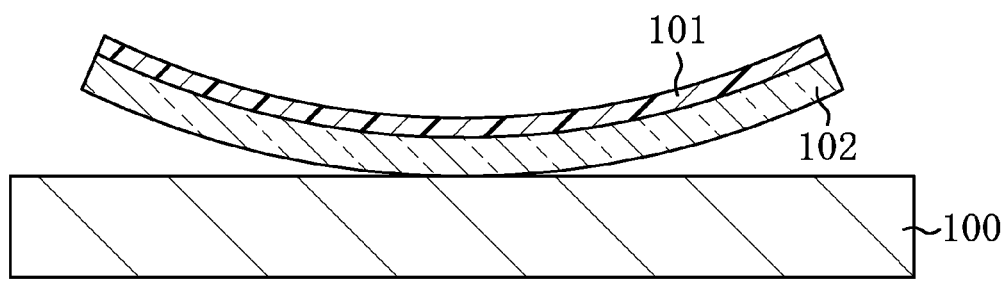
FIG. 6 shows a cross-sectional view of a conventional plastic substrate and a conventional support substrate which are warped in a concave shape.
Figure 7:
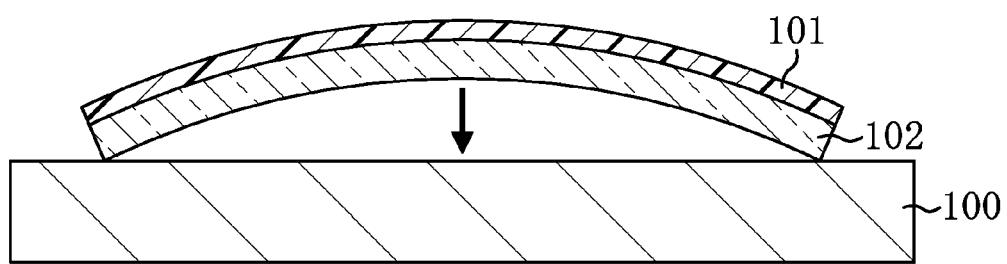
FIG. 7 shows a cross-sectional view of a conventional plastic substrate and a conventional support substrate which are warped in a convex shape.

Then, the plastic substrate 19 supported on the support substrate 50 is removed from the convexly-curved attachment table 53 onto a stage 55 or the like as shown in FIG. 5. The plastic substrate 19 and the support substrate 50 are convexly warped right after the removal, but when the plastic substrate 19 and the support substrate 50 become a room temperature, warping is gone and the plastic substrate 19 and the support substrate 50 become flat, as shown in FIG. 5. Here, in order to reduce the amount of warping in a room temperature after the attachment between the plastic substrate 19 and the support substrate 50 to almost zero, the attachment was made by using a jig including such as the convexly-curved attachment table 53 and the convexly-curved attachment upper plate 54 which are finely designed to have an radius of curvature of 30 meters or so. Here, the curvature may be changed according to an attachment temperature, a Young's modulus of the plastic substrate 19 or the support substrate 50, a thermal expansion coefficient, a thickness, or others.

Next, a thin film device is formed by laminating a plurality of thin films which form the thin film transistor 16, the pixel electrode, and the oriented film 17, and so on, on the plastic substrate 19 supported on the support substrate 50, using a device for manufacturing a thin film device that is used for the support substrate 50. In this fabrication step, the plastic substrate 19 is flat in a temperature close to a room temperature at which most of the transportation occurs. Further, in the process in which a temperature is increased such as by heating, the plastic substrate 19 is transported almost without warping due to the substrate's own weight. Thus, a thin film device can be successfully formed on the plastic substrate 19.

Next, the plastic substrate 19 supported on the support substrate 50 is separated from the support substrate 50 by laser irradiation from the rear surface, using such as a laser device. Here, alkali glass is used as a material for the support substrate 50, and SiNx is used as a material for the alkali metal elusion barrier layer 52. Thus, the laser irradiation utilizes a solid green laser (wavelength=532 nm) which can be easily transmitted through the alkali glass and the SiNx and for which the cost of the device is low. Further, the plastic substrate 19 may be separated by a method other than the laser irradiation. The thin film transistor substrate 13 is formed in this way.

Next, in a manner similar to the above description, thin film devices such as the color filter layer 30, the black matrix layer 34, the counter electrode 31 and the oriented film 27 are formed, with the plastic substrate 32 supported on the support substrate 50. The support substrate 50 is separated thereafter, thereby forming the counter substrate 14.

Next, the thin film transistor substrate 13 and the counter substrate 14 are attached to each other. First, the sealing member 29 is provided in a frame region of the thin film transistor substrate 13 or the counter substrate 14 on the side of the oriented film 17, 27, in a generally frame-like shape. Here, the sealing member 29 is formed such that an injection hole for injecting a liquid crystal material is formed when the thin film transistor substrate 13 and the counter substrate 14 are attached to each other. Then, the thin film transistor substrate 13 and the counter substrate 14 are attached to each other via the sealing member 29 such that the oriented films 17, 27 face each other. The liquid crystal material is injected through the injection hole, and the injection hole is sealed thereafter, thereby forming the liquid crystal layer 15.

Next, polarizing plates 18, 28 are respectively formed on the surfaces of the thin film transistor substrate 13 and the counter substrate 14 that are opposite to the surfaces on which the liquid crystal layer 15 is provided, thereby forming the liquid crystal display panel 11. The back light 12 is provided for the liquid crystal display panel 11 to complete the formation of the liquid crystal display device 10.

In the fabrication method according to the above embodiment, two substrates, i.e., the thin film transistor substrate 13 and the counter substrate 14, are attached to each other. Thus, in order to make it easier to transport the substrate after separation from the support substrate 50, the thin film transistor substrate 13 and the counter substrate 14 may be attached to each other, with a support substrate 50 supporting each of the thin film transistor substrate 13 and the counter substrate 14, and thereafter may be separated from the respective support substrates 50.

In the present embodiment, an example utilizing a liquid crystal display (LCD) as a display device has been described. However, the display device is not limited to this, but for example, an organic electro-luminescence (organic EL) display, an inorganic electro-luminescence (inorganic EL) display, an electrophoretic display, a plasma display (PD), a plasma addressed liquid crystal display (PALC), a field emission display (FED), or a surface-conduction electron-emitter display (SED) may be utilized as a display device.

(Operation and Effect)

Next, operation and effect according to an embodiment of the present invention will be described.

According to a method for manufacturing the liquid crystal display device 10, the plastic substrate 19 is supported and curved on the support substrate 50, and a plurality of thin films are laminated on the plastic substrate 19 supported on the support substrate 50. Thus, in the case where the plastic substrate 19 is transported, with the plastic substrate 19 supported on the support substrate 50 whose linear expansion coefficient and water absorption properties are different from those of the plastic substrate 19, it is possible to control the amount of warping of the substrate to an appropriate amount before fabrication of a thin film lamination device in which a plurality of thin films are laminated. Consequently, the plastic substrate 19 and the support substrate 50 can be transported with ease, and it is possible to form highly reliable devices.

Industrial Applicability

As described above, the present invention is useful as a method for manufacturing a display device and a display device.

The invention claimed is:

1. A method for manufacturing a display device, comprising:
    a substrate supporting step for supporting a flexible substrate on a support substrate, with the flexible substrate curved, and
    a thin film lamination step for laminating a plurality of thin films on the flexible substrate supported on the support substrate, wherein
    the support substrate is an alkali glass substrate, wherein
    an alkali metal elusion barrier layer is provided on a rear surface of the alkali glass substrate.

2. The method for manufacturing the display device of claim 1, wherein
    the alkali metal elusion barrier layer is provided on the rear surface of the alkali glass substrate, and in this state, holds the alkali glass substrate in a convex shape.

3. A method for manufacturing a display device, comprising:
    a substrate supporting step for supporting a flexible substrate on a support substrate, with the flexible substrate curved, and
    a thin film lamination step for laminating a plurality of thin films on the flexible substrate supported on the support substrate, wherein
    in the substrate supporting step, the flexible substrate is attached to the support substrate to be supported by the support substrate, wherein
    in the substrate supporting step, the flexible substrate is attached to the support substrate such that each of the flexible substrate and the support substrate becomes flat in a room temperature after the flexible substrate and the support substrate attached to each other are placed on a flat portion.

4. A method for manufacturing a display device, comprising:
    a substrate supporting step for supporting a flexible substrate on a support substrate, with the flexible substrate curved, and
    a thin film lamination step for laminating a plurality of thin films on the flexible substrate supported on the support substrate, wherein
    in the substrate supporting step, the flexible substrate is attached to the support substrate to be supported by the support substrate, wherein
    in the substrate supporting step, the flexible substrate and the support substrate are attached to each other with a thermosetting adhesive, wherein
    a film thickness of the thermosetting adhesive with which the flexible substrate and the support substrate are attached to each other is 10-100 μM.

5. A method for manufacturing a display device, comprising:
- a substrate supporting step for supporting a flexible substrate on a support substrate, with the flexible substrate curved, and
- a thin film lamination step for laminating a plurality of thin films on the flexible substrate supported on the support substrate. wherein
- in the substrate supporting step, the flexible substrate is attached to the support substrate to be supported by the support substrate, wherein
- in the substrate supporting step, the flexible substrate and the support substrate are attached to each other with a thermosetting adhesive, wherein
- in the substrate supporting step, the thermosetting adhesive is cured at a temperature obtained by dividing by 2 a result of subtracting a lowest process temperature from a highest process temperature of process temperatures for laminating the plurality of thin films on the flexible substrate in the thin film lamination step.

* * * * *